(12) United States Patent
Nagao

(10) Patent No.: US 10,318,838 B2
(45) Date of Patent: Jun. 11, 2019

(54) DRAWING APPARATUS, OPERATION CONTROL METHOD FOR DRAWING APPARATUS, AND COMPUTER-READABLE RECORDING MEDIUM

(71) Applicant: CASIO COMPUTER CO., LTD., Shibuya-ku, Tokyo (JP)

(72) Inventor: Tomoyuki Nagao, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 186 days.

(21) Appl. No.: 14/932,219

(22) Filed: Nov. 4, 2015

(65) Prior Publication Data
US 2016/0182867 A1 Jun. 23, 2016

(30) Foreign Application Priority Data
Dec. 19, 2014 (JP) .................. 2014-256955

(51) Int. Cl.
| H04N 5/20 | (2006.01) |
| G06K 9/46 | (2006.01) |
| G06K 9/00 | (2006.01) |
| G06K 9/20 | (2006.01) |

(Continued)

(52) U.S. Cl.
CPC ....... *G06K 9/4604* (2013.01); *G06K 9/00375* (2013.01); *G06K 9/209* (2013.01); *A45D 2029/005* (2013.01); *H04N 5/2256* (2013.01)

(58) Field of Classification Search
USPC ......................................... 348/77
See application file for complete search history.

(56) References Cited

U.S. PATENT DOCUMENTS 8,814,289 B2 8/2014 Yamasaki
9,156,282 B2 10/2015 Yamasaki
(Continued)

FOREIGN PATENT DOCUMENTS

CN 102756557 A 10/2012
JP 60163163 A 8/1985
(Continued)

OTHER PUBLICATIONS

Chinese Office Action dated Jun. 5, 2018 (and English translation thereof) issued in counterpart Chinese Application No. 201510920802.9.

(Continued)

*Primary Examiner* — Mikhail Itskovich
(74) *Attorney, Agent, or Firm* — Holtz, Holtz & Volek PC

(57) ABSTRACT

A drawing apparatus includes an object insertion portion to which an object is inserted, the object being a finger or a toe having a nail; a light source unit configured to emit light to the nail of the object inserted into the object insertion portion; an image acquisition unit configured to acquire image data of the object with the nail illuminated by the light; and a control unit.
The light source unit includes at least one light source disposed obliquely above the nail so that a shadow is formed near a border between the nail and a cuticle part on the root side of the nail by the light emitted from the light source. The control unit detects a position of the border based on the shadow and detects a region of the nail based on the position of the border.

6 Claims, 9 Drawing Sheets

(51) Int. Cl.
    *H04N 5/225*     (2006.01)
    *A45D 29/00*     (2006.01)

(56) References Cited

U.S. PATENT DOCUMENTS

| | | | |
|---|---|---|---|
| 2006/0045316 A1* | 3/2006 | Hauke | G06K 9/00033 |
| | | | 382/116 |
| 2012/0274683 A1 | 11/2012 | Yamasaki | |
| 2013/0038648 A1* | 2/2013 | Kasahara | B41J 3/407 |
| | | | 347/2 |
| 2014/0267517 A1 | 9/2014 | Yamasaki | |

FOREIGN PATENT DOCUMENTS

| | | |
|---|---|---|
| JP | 2000125289 A | 4/2000 |
| JP | 2009037463 A | 2/2009 |
| JP | 2012146182 A | 8/2012 |
| JP | 2014176441 A | 9/2014 |

OTHER PUBLICATIONS

Japanese Office Action (and English language translation thereof) dated Nov. 13, 2018 issued in Japanese Application No. 2014-256955.

\* cited by examiner

← BACK SIDE OF APPARATUS    FRONT SIDE OF APPARATUS →

BACK SIDE OF APPARATUS  FRONT SIDE OF APPARATUS

DRAWING APPARATUS, OPERATION CONTROL METHOD FOR DRAWING APPARATUS, AND COMPUTER-READABLE RECORDING MEDIUM

CROSS-REFERENCE TO RELATED APPLICATIONS

This application claims the benefit of Japanese Priority Patent Application No. 2014-256955 filed on Dec. 19, 2014, the entire content of which is incorporated herein by reference.

BACKGROUND OF THE INVENTION

1. Field of the Invention

The present invention relates to a drawing apparatus, an operation control method for a drawing apparatus, and a computer-readable recording medium storing an operation control program.

2. Description of the Related Art

Drawing apparatuses with a finger insertion portion have conventionally been suggested. A finger is inserted into the finger insertion portion so that its nail has a design drawn thereon.

Such a drawing apparatus needs to detect a region of a nail (nail region) of a finger for determining the printing range. For this purpose, a method has been known in which an image of a finger to be printed is acquired with a camera and the nail region is detected from the acquired image.

A technique for detecting the nail region is disclosed in, for example, JP-A-2012-146182 which employs the watershed method. The watershed method is one of the methods for dividing a region, in which the luminance gradient of the image is regarded as the ridgelines of a mountain and the image is divided into sections, each section being formed by the basin of the water flowing from the highpoints of the mountain (i.e., high-luminance positions).

According to JP-A-2012-146182, the nail region starts from the region with the highest luminance and the region including that start point is detected by the watershed method. This enables the extraction of the nail region from the image.

In general, however, a human nail includes a nail tip portion (portion apart from a nail bed portion) which seems whiter and has higher luminance than the other parts. For this reason, the detection of the nail tip portion has been difficult in the watershed method.

BRIEF SUMMARY OF THE INVENTION

The present invention has an advantage that can provide a drawing apparatus, an operation control method for a drawing apparatus, and a computer-readable recording medium storing an operation control program for the drawing apparatus, which can extract the entire nail region correctly.

According to an aspect of the present invention, there is provided a drawing apparatus including: an object insertion portion to which an object is inserted, the object being a finger or a toe having a nail; a light source unit configured to emit light to the nail of the object inserted into the object insertion portion; an image acquisition unit configured to acquire image data of the object with the nail illuminated by the light; and a control unit configured to detect a region of the nail as a nail region based on the image data, wherein the light source unit includes at least one first light source, the first light source is disposed obliquely above the nail so that a first shadow is formed in an area including a border between the nail and a cuticle part on the root side of the nail by the light emitted from the first light source, and the control unit detects a position of the border based on the first shadow and detects the nail region based on the position of the border.

According to an aspect of the present invention, there is provided an operation control method for a drawing apparatus, the method including: a light emitting step of emitting light from a light source unit to a nail of an object inserted into an object insertion portion, the object being a finger or a toe having the nail; an image acquisition step of acquiring image data of the object with the nail illuminated by the light; and a nail region detection step of detecting a region of the nail as a nail region based on the image data, in the light emitting step, emitting the light to the nail from at least one first light source included in the light source unit disposed obliquely above the nail so that a first shadow is formed in an area including a border between the nail and a cuticle part on the root side of the nail, and in the nail region detection step, detecting a position of the border based on the first shadow and detecting the nail region based on the position of the border.

According to an aspect of the present invention, there is provided a computer-readable recording medium storing an operation control program for a drawing apparatus, the program causing a computer to execute the steps of: emitting light from a light source unit to a nail of an object inserted into an object insertion portion, the object being a finger or a toe having the nail; acquiring an image data of the object with the nail illuminated by the light, the image data imaged by an imaging unit; and detecting a region of the nail as a nail region based on the image data, in a step of emitting the light, emitting the light to the nail from at least one first light source included in the light source unit disposed obliquely above the nail so that a first shadow is formed in an area including a border between the nail and a cuticle part on the root side of the nail, and in a step of detecting the nail region, detecting a position of the border based on the first shadow and detecting the nail region based on the position of the border.

BRIEF DESCRIPTION OF THE SEVERAL VIEWS OF THE DRAWINGS

FIG. 5A is an image imaged with the use of a first light source, FIG. 5B illustrates an edge detected from the image of FIG. 5A, FIG. 5C is an image imaged with the use of a second light source, FIG. 5D illustrates an edge detected from the image of FIG. 5C, and FIG. 5E illustrates a processed image obtained by synthesizing the edge in FIG. 5B and the edge in FIG. 5D;

FIG. 7A illustrates how the light sources are arranged in FIG. 3, FIG. 7B illustrates how the light sources are arranged in a first modified example, FIG. 7C illustrates how the light sources are arranged in a second modified example, FIG. 7D illustrates how the light sources are arranged in a third modified example, and FIG. 7E illustrates how the light sources are arranged in a fourth modified example;

DETAILED DESCRIPTION OF THE INVENTION

Figure 1:
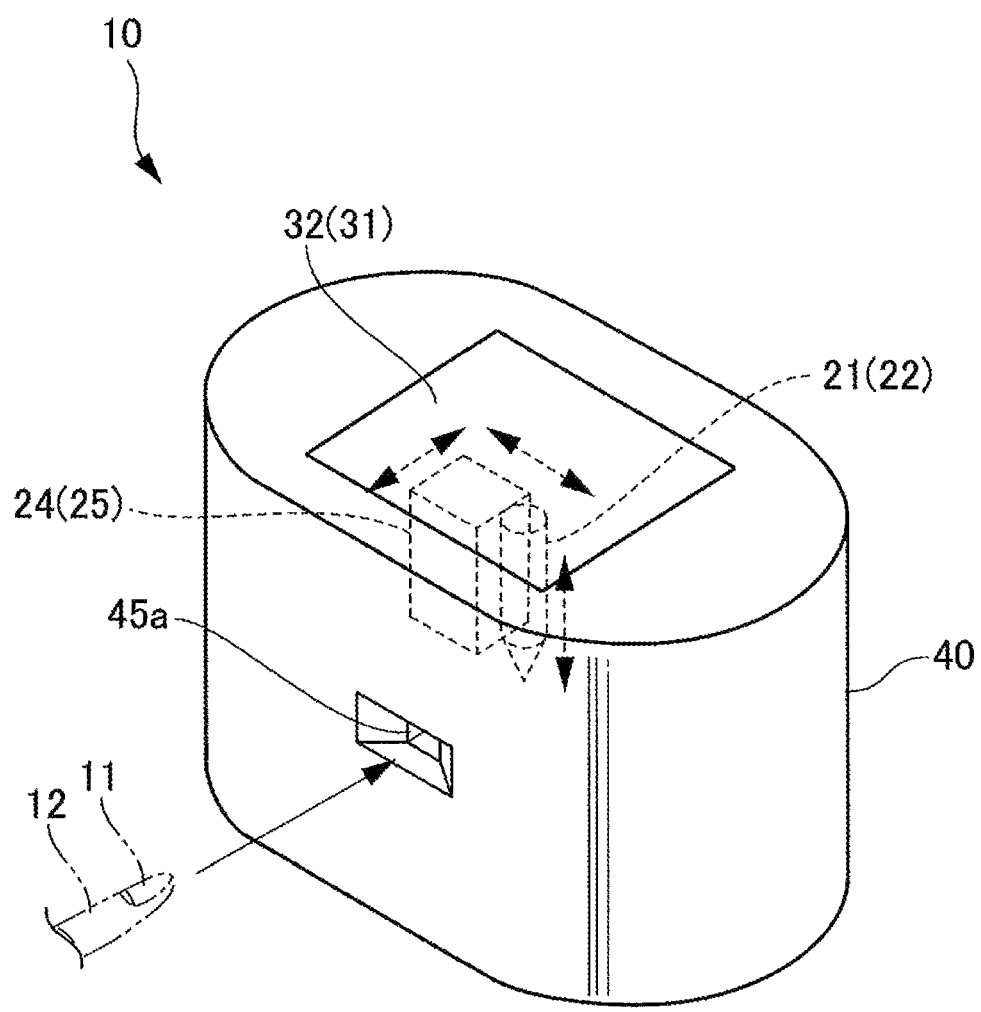
FIG. 1 is a perspective view illustrating an external appearance of a drawing apparatus according to an embodiment of the present invention.

Embodiments of a drawing apparatus according to the present invention are hereinafter described in detail with reference to the drawings.

The same reference signs are assigned to the same components throughout the description of the embodiments.

In the description below, "front" and "back" respectively refer to "front side" and "back side" from the viewpoint of the drawing apparatus and "right" and "left" respectively refer to "right side" and "left side" when the drawing apparatus is viewed from the front.

In the embodiment below, the drawing apparatus is intended to be used for a finger nail and draws a design on the finger nail. The drawing target according to the present invention, however, is not limited to the finger nail. The drawing target may be, for example, a toe nail.

Structure of Embodiment

The fundamental structure of the drawing apparatus is described with reference to FIG. 1 and FIG. 2.

Figure 2:
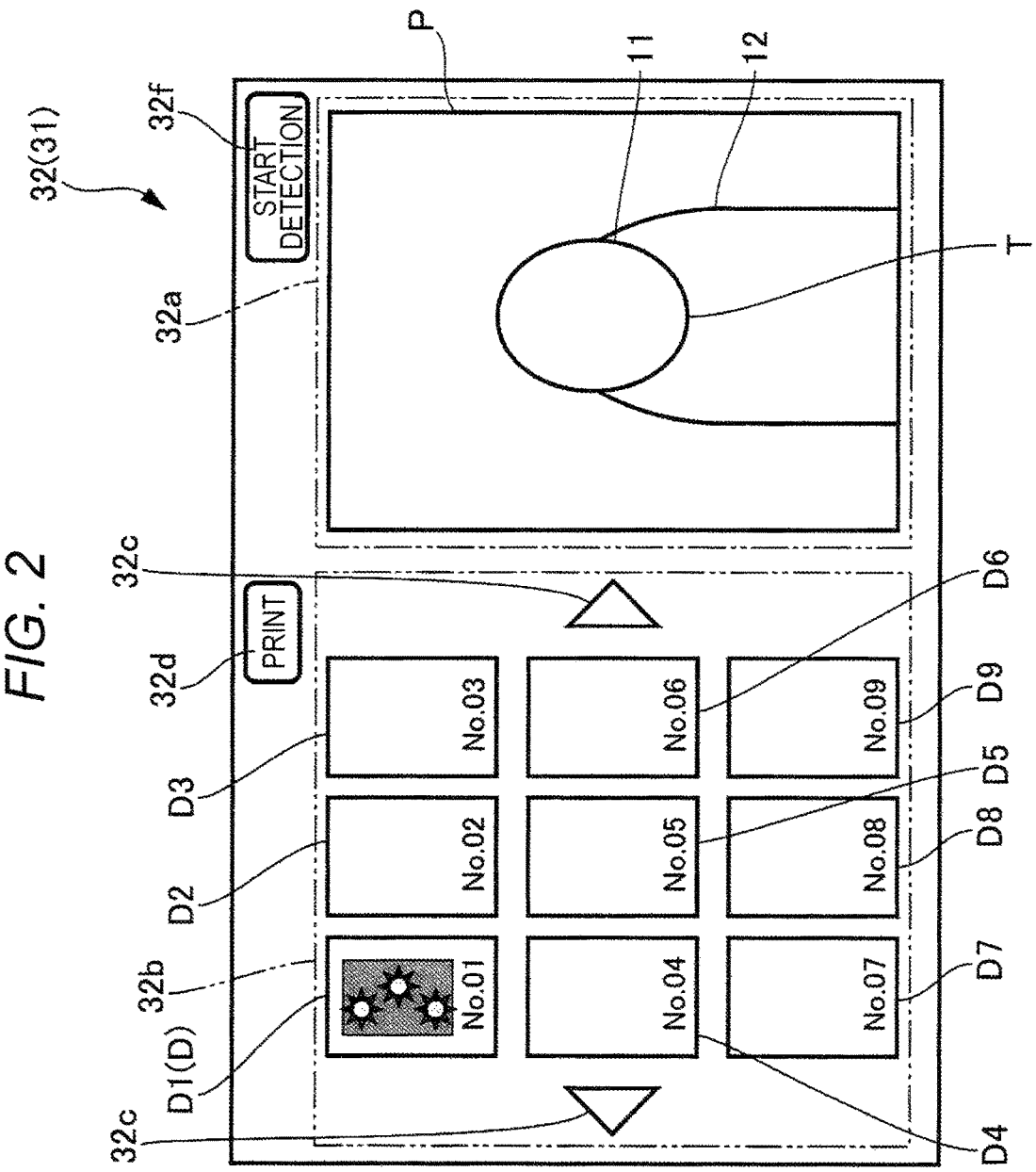
FIG. 2 is a plan view illustrating a display unit according to the embodiment.

FIG. 1 is a diagram conceptually illustrating the external appearance of the drawing apparatus, and FIG. 2 is a plan view illustrating a display unit thereof.

As illustrated in FIG. 1, a drawing apparatus 10 includes, for example, a printing function unit achieved by a printing unit 24 and a drawing function unit achieved by a drawing unit 21. By using these units in combination, a nail design D (see FIG. 2) is drawn on a nail 11 (drawing target) of a human finger 12.

The drawing apparatus 10 includes: a case main body 40, the drawing unit 21 and the printing unit 24 provided inside the case main body 40; a display unit 32 provided on an upper surface (top plate) of the case main body 40; and a finger insertion portion (object insertion portion) 45a provided to open at the front surface of the case main body 40.

The case main body 40 has a control device 51 (see FIG. 4) and an image acquisition unit 46 (see FIG. 4) housed therein.

As illustrated in FIG. 2, the display unit 32 corresponds to any kind of flat displays including a liquid crystal display (LCD) and an organic electroluminescence display.

The display unit 32 is, for example, a touch panel which also serves as an operation unit 31. The display unit 32 can receive the user instruction through a touch operation on a surface of the display unit 32 with a finger, a stylus or a sharp stick-like writing tool.

A design observation unit 32a is provided on one of right and left sides of the display unit 32 (right side in this example). With the design observation unit 32a, an image P including the imaged finger 12 and a nail region T (outline of the nail 11) in the image P can be observed.

A design selection unit 32b is provided on the other of the right and left sides of the display unit 32 (left side in this example). The design selection unit 32b displays a plurality of nail designs D1 to D9 (the specific illustration of the nail designs D2 to D9 is omitted).

In the description below, the nail designs D1, D2, D3 . . . may be collectively referred to as "nail design D" without the numeral behind the letter D.

In the design selection unit 32b, the nail design D to be drawn on the nail 11 can be selected from among the plurality of displayed nail designs D with the touch operation.

Other nail designs D, which are currently not displayed in the design selection unit 32b, can be displayed by pressing a triangular button 32c on the right or left side of the design selection unit 32b.

The display unit 32 further includes a print button 32d for starting the printing on the nail 11, and a detection start button 32f for starting the detection of the nail region (outline of the nail 11) T on the finger 12.

Next, the structure of the finger insertion portion 45a and its periphery is described with reference to FIG. 3.

Figure 3:
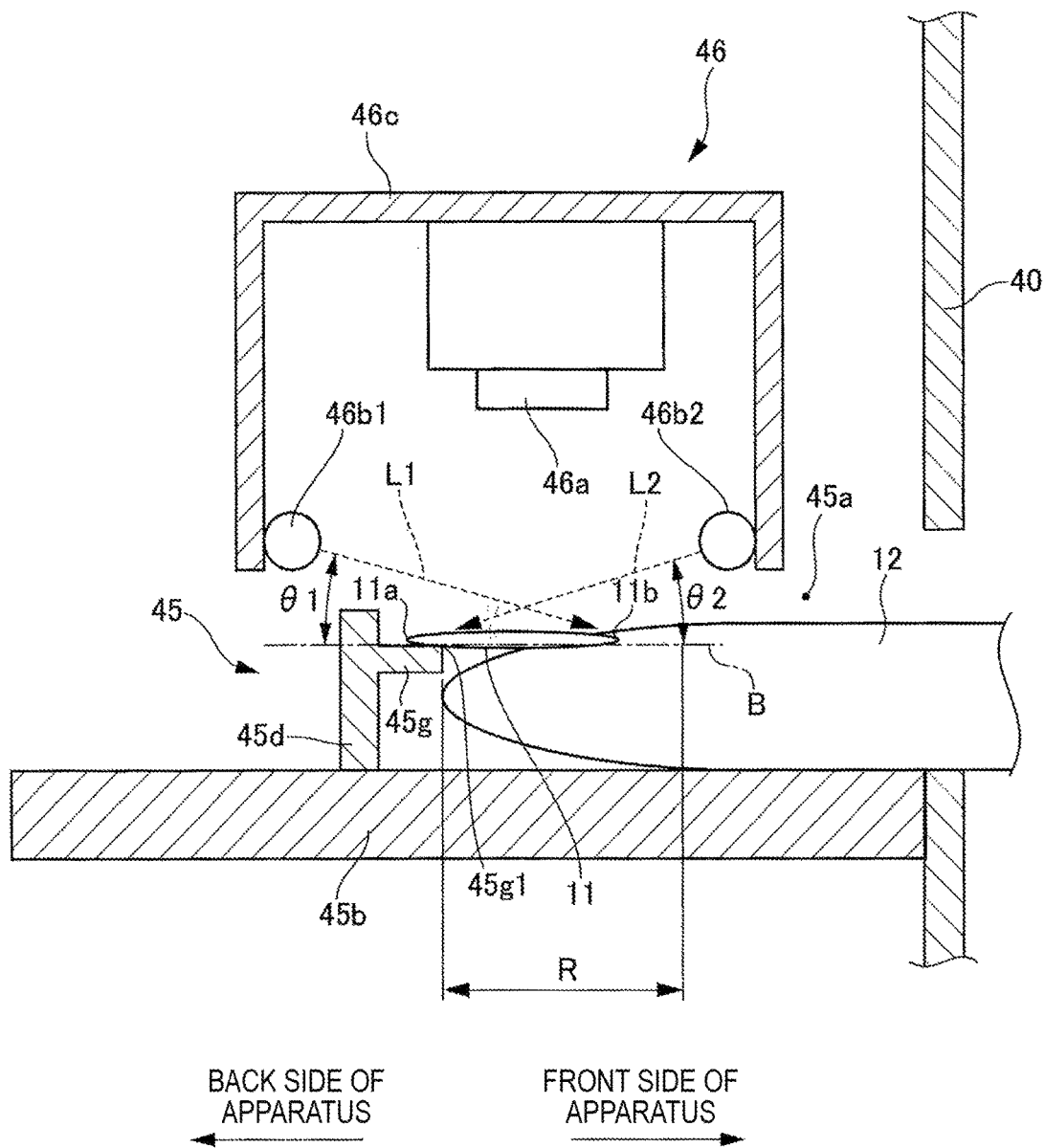
FIG. 3 is a schematic view illustrating a side section of an object insertion portion and its periphery according to the embodiment.

FIG. 3 is a schematic view illustrating a side section of the finger insertion portion and its periphery.

As illustrated in FIG. 3, the finger insertion portion 45a includes a finger placement portion 45b with a flat-plate shape on which the finger 12 can be placed, and a vertical wall 45d that stands on the finger placement portion 45b at the back side of the apparatus (in the direction where the finger 12 is inserted).

A nail placement portion 45g is provided on the upper part of the vertical wall 45d. The nail placement portion 45g is a shelf-like portion projecting toward the front side of the apparatus (in a direction opposite to the finger 12 insertion direction). A nail tip portion 11a can be placed on the nail placement portion 45g.

The finger placement portion 45b, the vertical wall 45d, and the nail placement portion 45g constitute a finger fixing portion 45.

The finger fixing portion 45 can have other various fixing mechanisms (not shown) for fixing the finger 12 while the finger 12 is placed at the right position.

The image acquisition unit 46 is provided above the finger insertion portion 45a (more specifically, above the finger 12 inserted into the finger insertion portion 45a).

The image acquisition unit 46 includes a box-shaped frame 46c that opens downward, and a camera 46a fixed on a ceiling wall of the frame 46c.

At least one first light source 46b1 is provided on the inside of the frame 46c. In FIG. 3, a second light source 46b2 is further provided on the inside of the frame 46c. The second light source 46b2, however, is not always needed and may be provided as necessary. The first light source 46b1 and the second light source 46b2 constitute a light source unit 47 according to the present invention.

The first light source 46b1 is fixed to, for example, the wall of the frame 46c at the back side of the apparatus.

That is, the first light source 46b1 is disposed more on the back side of the apparatus than the camera 46a, so that the light L1 can be emitted from the back side of the apparatus to the finger 12 in the obliquely downward direction from above the nail placement portion 45g. The first light source 46b1 illuminates the finger 12 and its periphery during the imaging with the camera 46a.

In FIG. 3, the light L1 is part of light emitted from the first light source 46b1 that travels toward a root (place from which the nail grows) 11b of the nail 11, while the light L2 is part of light emitted from the second light source 46b2 that travels toward the nail tip portion 11a on the tip end position of the nail.

The first light source 46b1 is disposed so as to emit the light L1 that satisfies the following condition: the light L1 reaches a predetermined position on a reference plane B extended from an upper surface of the nail placement portion 45g substantially horizontally toward the root (place from which the nail grows) 11b of the nail 11 in the range R of, for example, 10 mm to 30 mm from an end 45g1 of the upper surface of the nail placement portion 45g toward the root 11b of the nail 11; and the light L1 travels in a direction with an inclination angle θ1 of approximately 5° from the back side of the apparatus above the nail placement portion 45g.

The first light source 46b1 may be, for example, a white LED.

The predetermined position on the reference plane B is preferably the position near the root (place from which the nail grows) 11b of the nail 11 of the inserted finger 12 as pointed by the light L1 illustrated in FIG. 3.

In an example, a pair of second light sources 46b2 is provided on the right and left of the wall of the frame 46c at the front side of the apparatus (see FIG. 7A, which is described below).

In other words, the second light sources 46b2 are provided more on the front side of the apparatus than the camera 46a, and the light L2 is emitted from the second light sources 46b2 to the nail tip portion 11a.

The second light source 46b2 is disposed to be able to emit the light L2 in an obliquely downward direction from the front of the apparatus of the nail placement portion 45g toward the nail tip portion 11a. The second light source 46b2 illuminates the finger 12 and its periphery in the imaging with the camera 46a.

In a manner similar to the first light source 46b1, the second light source 46b2 is preferably disposed to emit the light L2 in a direction with an inclination angle 82 of approximately 5° relative to the reference plane B.

For illuminating the nail tip portion 11a side, the second light source 46b2 is preferably disposed to emit the light L2 to the end 45g1 of the upper surface of the nail placement portion 45g or its vicinity as illustrated in FIG. 3. The second light source 46b2 is preferably a white LED, for example.

The camera 46a is fixed to a ceiling wall of the frame 46c. The camera 46a is to image the finger 12 inserted into the finger insertion portion 45a and the periphery of the finger 12 under the light of the first light source 46b1 and the second light source 46b2. For example, the camera 46a may be a two-million or more pixel camera.

Next, the structure of the control of the drawing apparatus 10 is described with reference to FIG. 4.

Figure 4:
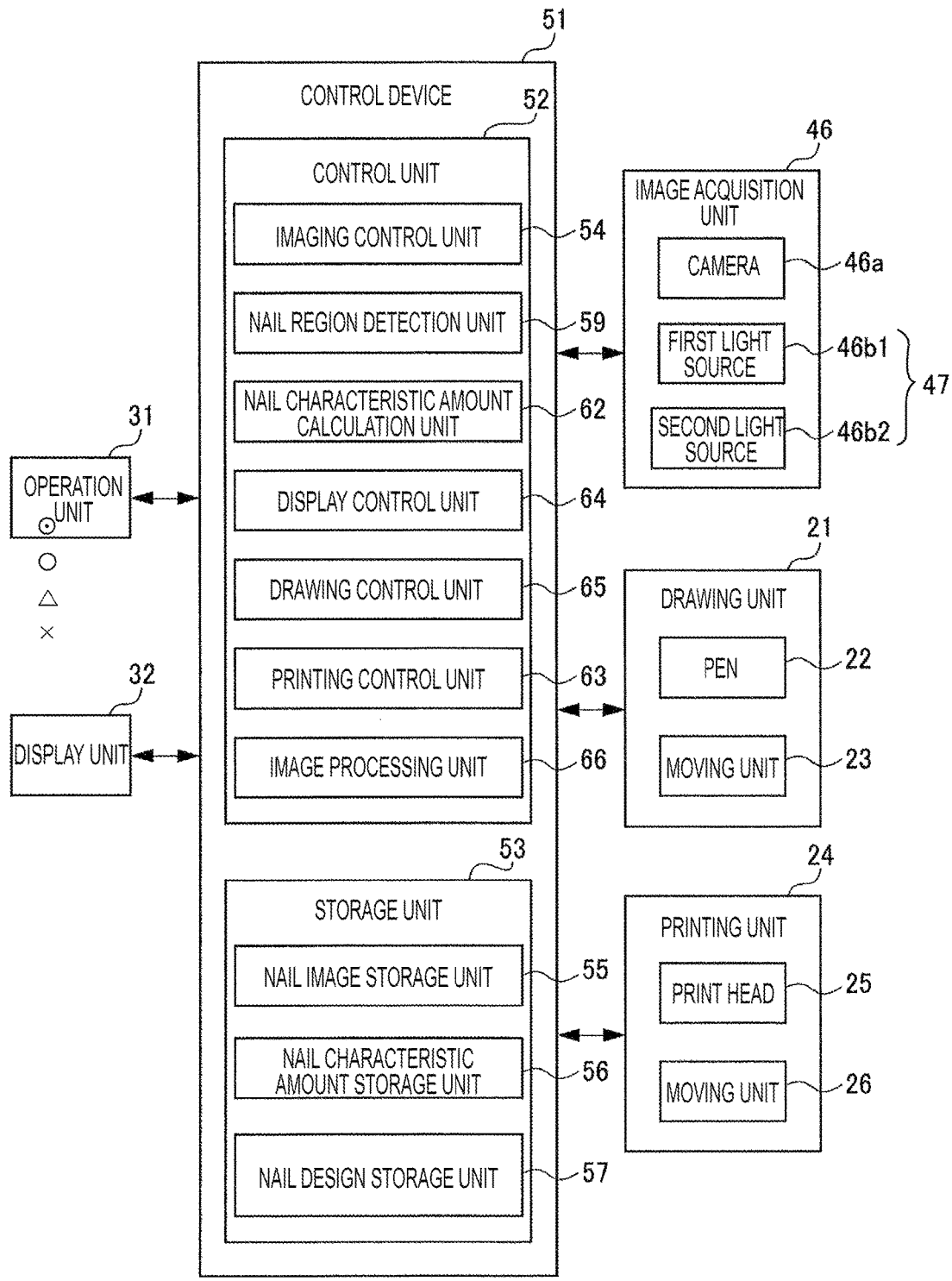
FIG. 4 is a block diagram illustrating a structure of the control according to the embodiment.

FIG. 4 is a block diagram illustrating the structure of the control.

As illustrated in FIG. 4, the control device 51 includes a control unit 52 including a central processing unit (CPU), and a storage unit 53 including read only memory (ROM) and random access memory (RAM).

The control unit 52 includes an imaging control unit 54, a nail region detection unit 59, a nail characteristic amount calculation unit 62, a display control unit 64, a drawing control unit 65, a printing control unit 63, and an image processing unit 66.

The functions of the imaging control unit 54, the nail region detection unit 59, the nail characteristic amount calculation unit 62, the display control unit 64, the drawing control unit 65, the printing control unit 63, and the image processing unit 66 are realized by the cooperation between the CPU of the control unit 52 and the programs stored in the ROM of the storage unit 53.

The control device 51 is connected to the operation unit 31, the display unit 32, the image acquisition unit 46, the drawing unit 21, and the printing unit 24.

The drawing unit 21 includes a pen 22 to draw a design on the nail 11 (drawing target), and a moving unit 23 including a motor or a moving mechanism for moving the pen 22.

The pen 22 internally has, for example, white ink for foundation. When the tip of the pen is in contact with the nail 11, the foundation can be drawn to the nail 11 with the ink.

The drawing unit 21 can move in the front-back direction, the right-left direction, and the up-down direction by the moving unit 23 (in directions indicated by dotted arrows in FIG. 1). The drawing unit 21 draws the foundation with the tip of the pen 22 lifted down on the surface of the nail 11.

The pen 22 of the drawing unit 21 may be not just the pen with the ink for foundation but the pen with various colors and various kinds of ink, with which various designs can be drawn on the nail 11 (drawing target).

The printing unit 24 includes a print head 25 of an inkjet method, and a moving unit 26 including a motor or a moving mechanism for moving the print head 25.

With the use of the print head 25, the printing unit 24 prints the nail design D on the part of the nail 11 that has the foundation.

The printing unit 24 can move in the front-back direction, the right-left direction, and the up-down direction by the moving unit 26 (in directions indicated by dotted arrows in FIG. 1). The printing unit 24 prints a desired design with the print head 25 lifted down on the surface of the nail 11.

The moving unit 23 and the moving unit 26 may be one common moving unit that can move both the drawing unit 21 and the printing unit 24 in the front-back direction, the right-left direction, and the up-down direction and move the pen 22 of the drawing unit 21 vertically.

The imaging control unit 54 controls the camera 46a of the image acquisition unit 46, the first light source 46b1, and the second light source 46b2 to image the finger 12 on the finger placement portion 45b (see FIG. 2) with the camera 46a. The imaging control unit 54 then acquires the image data of the finger 12 including the nail 11 (drawing target) and peripheral images P1 and P2 (see FIG. 5A and FIG. 5C).

The nail region detection unit 59 detects the nail region T based on the image data of the images P1 and P2 (see FIG. 5A and FIG. 5C) obtained with the camera 46a.

More specifically, the imaging control unit 54 turns on the first light source 4b1 and turns off the second light source 46b2. Then, the finger 12 illuminated by the first light source 46b1 is imaged with the camera 46a and the image data of the image P1 are acquired (see FIG. 5A).

Here, the first light source 46b1 emits the light L1 in an obliquely downward direction toward the root 11b of the nail 11 from the back side of the apparatus above the nail placement portion 45g.

Figure 5A:
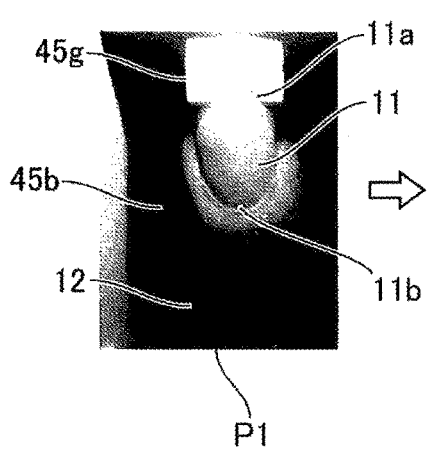
FIGS. 5A to 5E are explanatory views of the operation according to the embodiment.

In this illumination, the luminance is higher on the root 11b side of the nail 11 and a shadow is observed near the border between the nail 11 and a cuticle part on the root (place from which the nail grows) 11b side of the nail 11. In this case, this shadow is observed on the root 11b side of the nail 11 and in the region that is uneven due to the cuticle. As illustrated in FIG. 5A, the shadow whose luminance is relatively largely decreased (seems dark) is formed on the root 11*b* side of the nail 11 near the border between the nail 11 and the cuticle part. Thus, as compared to the case in which the light is emitted from substantially right above, the contrast at the border between the cuticle part and the nail 11 on the root 11*b* side is improved in the image P1.

Figure 5B:
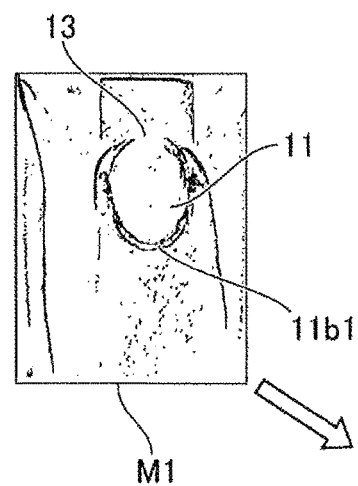

Thus, the nail region detection unit 59 detects the edge of the nail 11 based on the image data of the image P1, and this provides a processed image M1 in which an outline 11*b*1 of the nail 11 on the root 11*b* side is more accurately detected (see FIG. 5B).

Next, the imaging control unit 54 turns off the first light source 46*b*1 and turns on the second light source 46*b*2. The finger 12 illuminated by the second light source 46*b*2 is imaged with the camera 46*a* and the image data of the image P2 are acquired (see FIG. 5C).

On this occasion, the second light source 46*b*2 emits the light L2 in an obliquely downward direction from the front of the apparatus toward the nail tip portion 11*a*. Thus, the difference in luminance between a border 11*a* 1 of the nail tip portion 11*a* of the nail 11 and the background (nail placement portion 45*g*) becomes larger than that in the case of the illumination by the first light source 46*b*1.

Figure 5E:
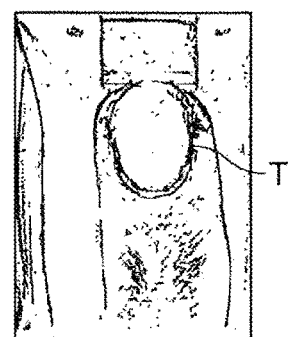
Figure 5C:
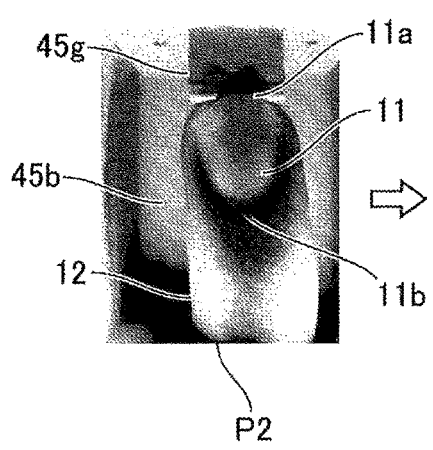
Figure 5D:
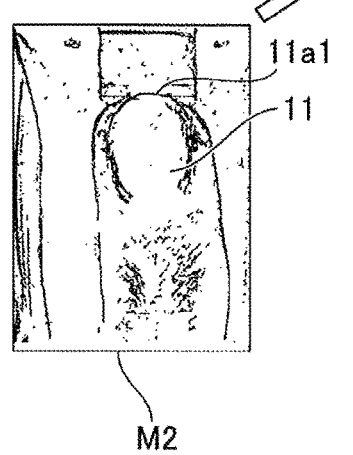

Thus, the nail region detection unit 59 detects the edge of the nail 11 based on the image data of the image P2, and this provides a processed image M2 in which the outline 11*a*1 of the nail tip portion 11*a* of the nail 11 is more accurately detected (see FIG. 5D).

On this occasion, the luminance is low on the root 11*b* side of the nail 11. Thus, the contrast at the border with the cuticle on the root 11*b* side of the nail 11 is lower than that in the case of the illumination by the first light source 46*b*1.

The nail region detection unit 59 synthesizes the two processed images M1 and M2 to provide a processed image M3 where the entire nail region T is extracted correctly. The nail region detection unit 59 detects the entire nail region T based on the processed image M3 (see FIG. 5E).

In this example, the edge of the border 11*a* 1 of the nail tip portion 11*a* of the nail 11 is detected at higher accuracy. For this purpose, the image P2 is also acquired using the second light source 46*b*2. If, however, an area 13 that is deficient in the edge on the nail tip portion side of the processed image M1 (see FIG. 5B) can be compensated in the compensation process in the processed image M1, the entire nail region T can be extracted without necessarily acquiring the image P2 and the processed image M2.

In this case, just the first light source 46*b*1 may be disposed as the light source and the second light source 46*b*2 may be omitted.

The nail characteristic amount calculation unit 62 calculates the characteristic amount of the nail 11 by analyzing the nail region T.

More specifically, the length, the aspect ratio, and the area of the nail 11 are obtained from the nail region T.

The display control unit 64 controls the display unit 32 to display various screens on the display unit 32.

The display control unit 64 displays various display screens on the design selection unit 32*b*, the design observation unit 32*a*, and the image P, and various buttons including the print button 32*d*, a finger image acquisition button 32*e*, and the detection start button 32*f* on the display unit 32.

The drawing control unit 65 controls the operation of the pen 22 through the moving unit 23 to draw, for example, a white foundation on the nail 11 with the pen 22.

The printing control unit 63 controls the operation of the print head 25 through the moving unit 26 to print the nail design D on the nail 11 with the print head 25.

The image processing unit 66 generates the drawing data by reducing or expanding the nail design D selected by the user in accordance with the nail region T of the image P.

The storage unit 53 stores various programs and various pieces of data for operating the drawing apparatus 10.

The ROM of the storage unit 53 stores the programs including the operation control program. With the operation control program, the finger 12 with the nail 11 on the nail placement portion 45*g* is illuminated by the first light source 46*b*1, the finger 12 illuminated by the first light source 46*b*1 is imaged with the camera 46*a*, and the image P1 of the finger 12 including the nail 11 is acquired. The units of the drawing apparatus 10 are collectively controlled by the execution of the programs by the control device 51.

The storage unit 53 includes a nail image storage unit 55 storing the nail region T of the user acquired by the image acquisition unit 46, a nail characteristic amount storage unit 56 storing the characteristic amount calculated by the nail characteristic amount calculation unit 62, and a nail design storage unit 57 storing the plural nail designs D.

Operation in Embodiment

Next, an operation control method for the drawing apparatus 10 is described with reference to FIG. 6.

Figure 6:
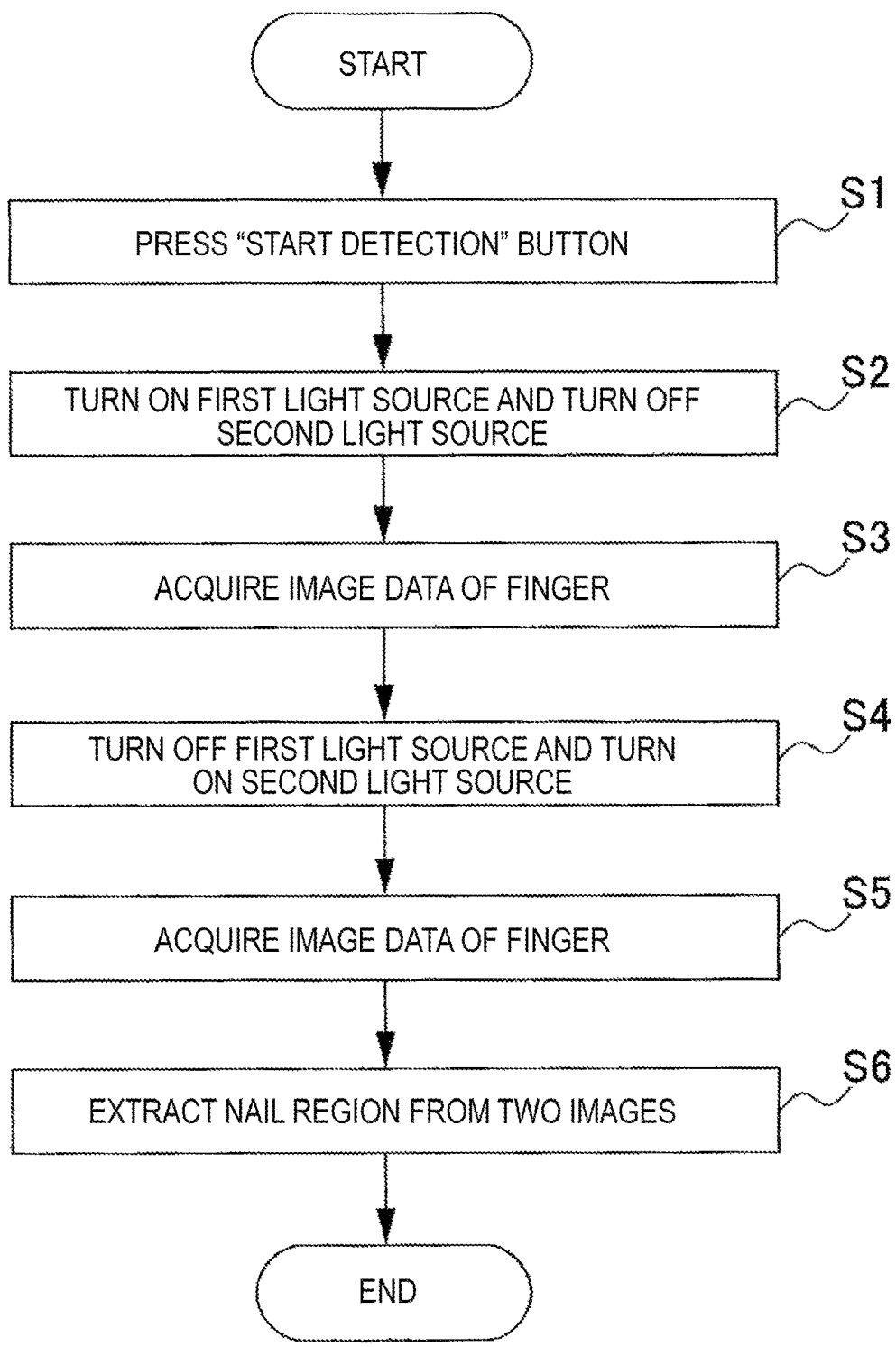
FIG. 6 is a flowchart for describing the embodiment.

FIG. 6 is a flowchart illustrating the operation of the drawing apparatus.

In this example, the first light source 46*b*1 and the second light source 46*b*2 are provided.

As illustrated in FIG. 6, first, in Step S1, a user presses the detection start button 32*f* on the display unit 32 with his/her finger 12 placed on the finger placement portion 45*b*.

Pressing the detection start button 32*f* turns on the first light source 46*b*1 and turns off the second light source 46*b*2 in Step S2.

In Step S3, the nail 11 is placed on the nail placement portion 45*g* and the finger 12 illuminated by the first light source 46*b*1 is imaged with the camera 46*a*. The image data of the image P1 is acquired (see FIG. 5A).

In Step S4, the first light source 46*b*1 is turned off and the second light source 46*b*2 is turned on.

In Step S5, the finger 12 with the nail 11 placed on the nail placement portion 45*g* and illuminated by the second light source 46*b*2 is imaged with the camera 46*a*. The image data of the image P2 is acquired (see FIG. 5C).

In Step S6, the edge detection is performed for each of the image P1 (see FIG. 5A) and the image P2 (see FIG. 5C) based on the obtained image data, and the two processed images M1 and M2 (see FIG. 5B and FIG. 5D) are synthesized to provide the processed image M3 (see FIG. 5E) in which the entire nail region T is extracted.

Effect of Embodiment

According to the embodiment described above, the finger 12 (on the root 11*b* side of the nail 11) is illuminated with the light L1 emitted from the first light source 46*b*1 in the direction with the relatively small inclination angle 81 from the nail tip portion 11*a* side. This can increase the luminance at the border 11*b*1 on the root 11*b* side of the nail 11, at which the edge detection has been difficult. Thus, the processed image M1 in which the edge is detected at higher accuracy on the root 11*b* side of the nail 11 can be obtained.

In addition, for ensuring the edge detection at the border 11a1 of the nail tip portion 11a, the light L2 is emitted from the second light source 46b2 in the obliquely downward direction from the front of the apparatus toward the nail tip portion 11a. This can increase the luminance difference between the border 11a1 of the nail tip portion 11a and the background. Thus, the processed image M2 in which the edge is detected at higher accuracy at the border 11a1 of the nail tip portion 11a is obtained.

According to this embodiment, the processed image M3 where the entire nail region T is correctly extracted can be obtained.

For enabling the more accurate edge detection at the border 11a1 of the nail tip portion 11a, the upper surface of the nail placement portion 45g may have a color that allows less reflection (for example, black).

(Another Arrangement of Light Sources)

Next, first to fourth modified examples in regard to the arrangement of the light sources are described with reference to FIG. 7A to FIG. 7E.

Figure 7A:
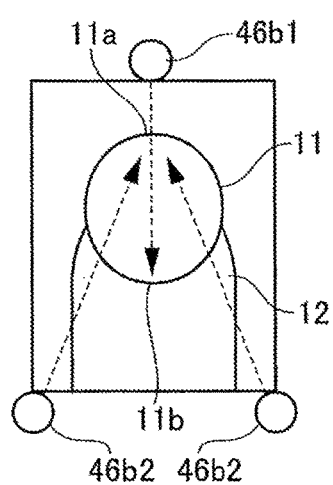
FIGS. 7A to 7E illustrate how the light sources are arranged in a light source unit.

FIG. 7A to FIG. 7E illustrate the arrangement of the light sources. FIG. 7A illustrates how the light sources are arranged in FIG. 3.

Figure 7B:
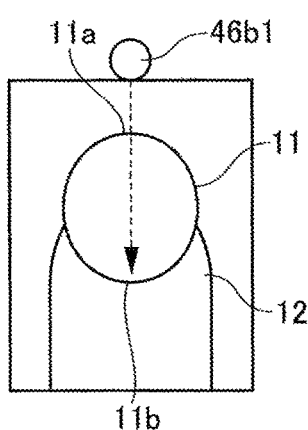

FIG. 7B illustrates how the light source is arranged according to the first modified example.

Figure 7C:
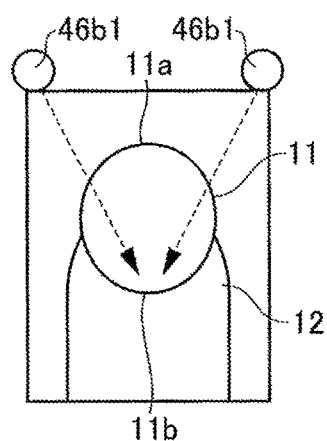

FIG. 7C illustrates how the light sources are arranged according to the second modified example.

Figure 7D:
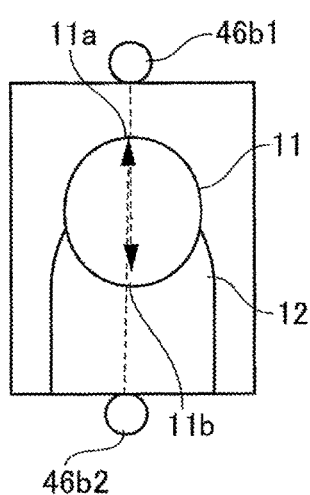

FIG. 7D illustrates how the light sources are arranged according to the third modified example.

Figure 7E:
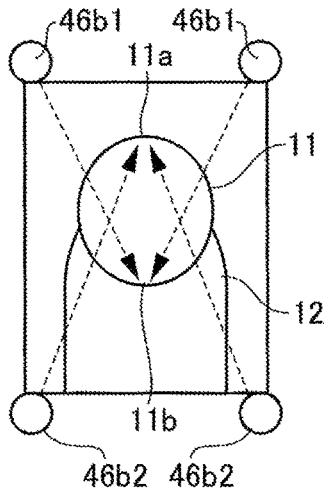

FIG. 7E illustrates how the light sources are arranged according to the fourth modified example.

Figure 8:
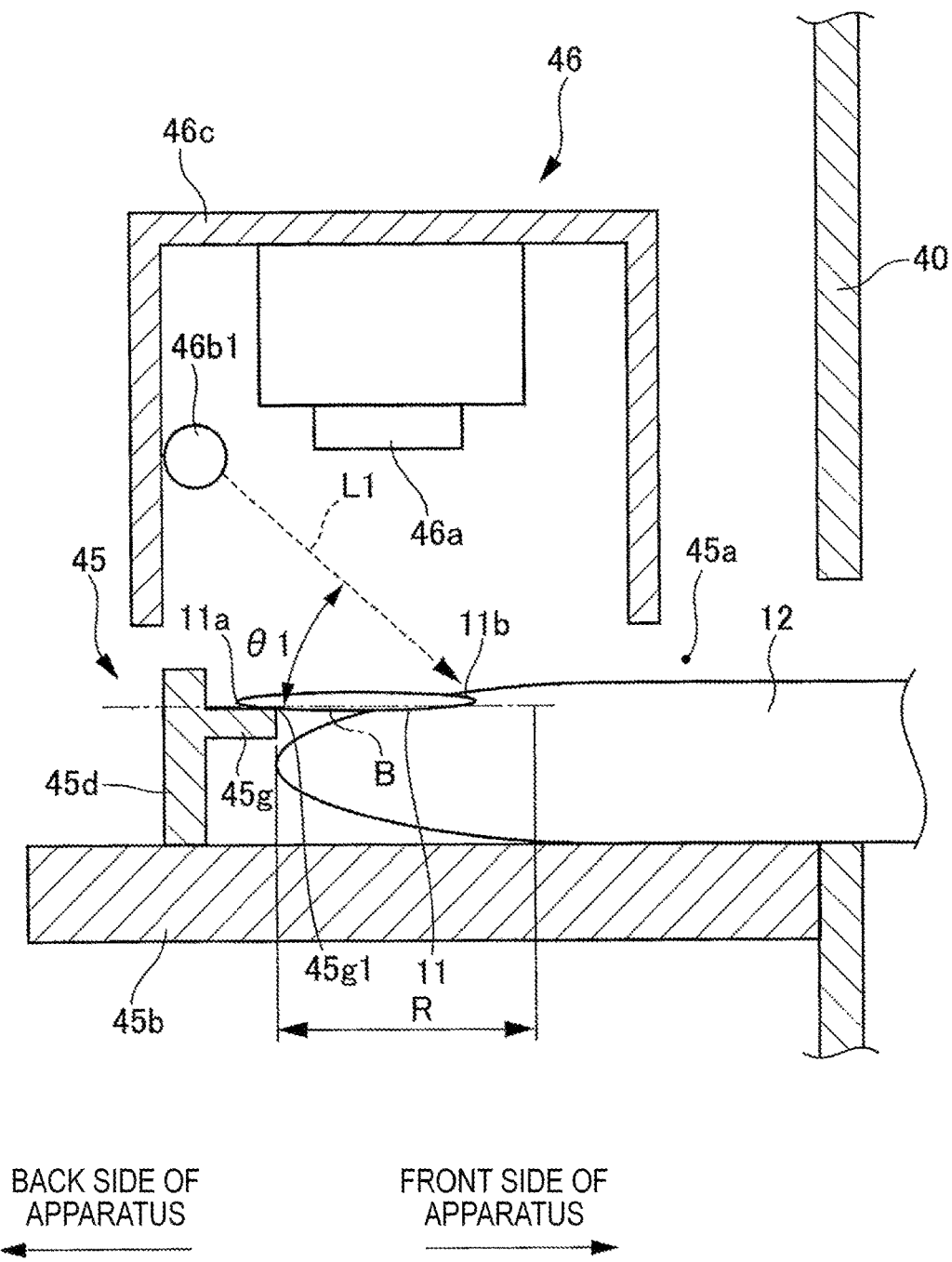
FIG. 8 is a schematic view illustrating a side section of the object insertion portion and its periphery with the light source arranged according to the first modified example illustrated in FIG. 7B.

FIG. 8 schematically illustrates the side section of the finger insertion portion and its periphery in the arrangement of the light source according to the first modified example illustrated in FIG. 7B.

The aforementioned drawing apparatus 10 includes one first light source 46b1 and a pair of second light sources 46b2 (see FIG. 3 and FIG. 7A).

The number of, and the arrangement of the first light sources 46b1 and the second light sources 46b2 are not limited to the above ones.

For example, the first modified example illustrated in FIG. 7B corresponds to the example in which just one first light source 46b1 is disposed and the second light source 46b2 is omitted. In this case, as illustrated in FIG. 8, the first light source 46b1 is disposed so as to emit the light L1 that satisfies the following condition: the light L1 reaches a predetermined position on the reference plane B extended from the upper surface of the nail placement portion 45g substantially horizontally toward the root 11b of the nail 11 in the range R of, for example, 10 mm to 30 mm from the end 45g1 of the upper surface of the nail placement portion 45g toward the root 11b of the nail 11; and the light L1 has a traveling direction with an inclination angle θ1 of approximately 45° from the back side of the apparatus above the nail placement portion 45g relative to the reference plane B.

In this example, the predetermined position on the reference plane B is preferably the position near the root 11b of the nail 11 of the inserted finger 12 as pointed by the light L1 illustrated in FIG. 8. The inclination angle θ1 can be set in the range of 5° or more and 45° or less.

In the second modified example illustrated in FIG. 7C, a pair of first light sources 46b1 is disposed on the right and left sides at the back of the apparatus and the second light source 46b2 is omitted.

In the third modified example illustrated in FIG. 7D, one first light source 46b1 is disposed in the center at the back of the apparatus and one second light source 46b2 is disposed in the center at the front of the apparatus.

In the fourth modified example illustrated in FIG. 7E, a pair of first light sources 46b1 is disposed on the right and left sides at the back of the apparatus and pair of second light sources 46b2 is disposed on the right and left side at the front of the apparatus.

The structures illustrated in FIG. 7B to FIG. 7E can similarly provide the effect equal to the effect obtained from the aforementioned embodiment.

Another Embodiment

Next, another embodiment of the present invention is described with reference to FIG. 9.

Figure 9:
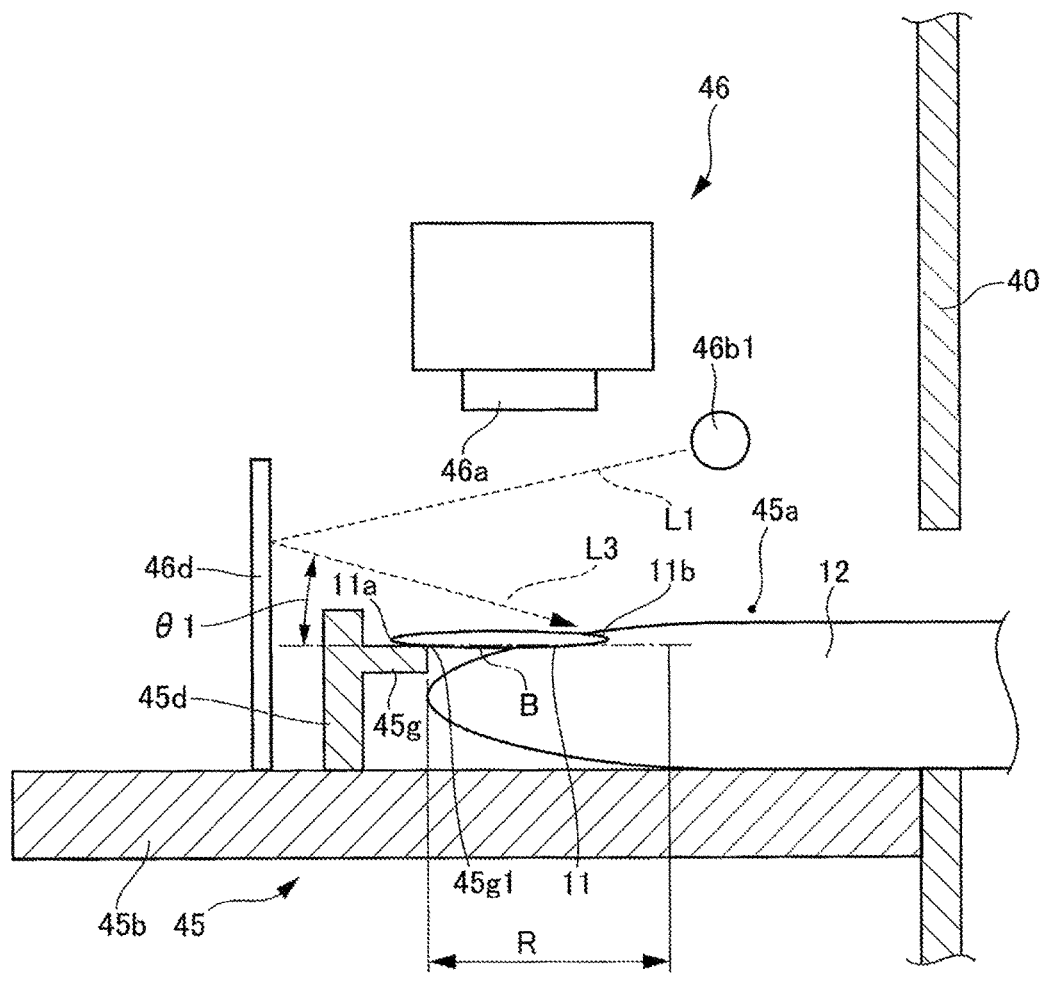
FIG. 9 is a schematic view illustrating a side section of the object insertion portion and its periphery according to another embodiment.

FIG. 9 schematically illustrates the side section of the finger insertion portion and its periphery according to another embodiment.

The aforementioned drawing apparatus 10 has the structure in which the finger 12 is directly irradiated with the light (L1) emitted from the first light source 46b1 (see FIG. 3). The present invention, however, is not limited to this structure.

Another structure may be employed in which the light emitted from the first light source 46b1 is reflected by a reflection plate so that the reflection light is emitted in an obliquely downward direction from the back side of the apparatus toward the finger 12 above the nail placement portion 45g.

For example, as illustrated in FIG. 9, the first light source 46b1 may be disposed more on the front side of the apparatus than the camera 46a, and a reflection plate 46d may be disposed more on the back side of the apparatus than the vertical wall 45d. In this structure, the light emitted from the first light source 46b1 and reflected on the reflection plate 46d is emitted to the nail 11.

In this case, the light L1 emitted from the first light source 46b1 is reflected on the reflection plate 46d to produce light L3. The light L3 reflected on the reflection plate 46d reaches a predetermined position on the reference plane B extended from the upper surface of the nail placement portion 45g substantially horizontally toward the root 11b of the nail 11 in the range R of, for example, 10 mm to 30 mm from the end 45g1 of the upper surface of the nail placement portion 45g toward the root 11b of the nail 11 and the light L3 travels in a direction with an inclination angle θ1 of 5° or more and 45° or less from the back side of the apparatus above the nail placement portion 45g relative to the reference plane B.

In this embodiment, the light L3 reflected on the reflection plate 46d illuminates the finger 12 (root 11b of the nail 11) at the relatively small inclination angle 81 from the nail tip portion 11a side. This can increase the luminance at the border 11b1 on the root 11b side of the nail 11, at which the edge detection has been difficult. Thus, more accurate edge detection becomes possible.

What is claimed is:

1. A drawing apparatus comprising:
an object insertion receptacle into which an object is insertable in an insertion direction, the object being a finger or a toe having a nail, the object insertion receptacle having an entrance through which the object is insertable in the insertion direction;
a nail placement structure configured to have placed thereon a nail tip portion of the nail of the object inserted in the object insertion receptacle, wherein the nail placement structure has an upper surface on which the nail tip portion of the nail of the object inserted into the object insertion receptacle is to be placed, the nail placement structure having a proximal end side which faces the entrance in the insertion direction;

a printer configured to perform printing on the nail of the object when the object is inserted in the object insertion receptacle and the nail tip portion is placed on the nail placement structure;

a light source device configured to emit light to the nail of the object when the object is inserted into the object insertion receptacle;

a camera configured to acquire image data of the object with the nail illuminated by the light; and a processor configured to detect a region of the nail as a nail region based on the image data, wherein:

the light source device includes at least one first light source and at least one second light source, the first light source is disposed at a first position which is located obliquely above the upper surface of the nail placement structure, and which is farther from the entrance in the insertion direction than the proximal end side of the nail placement structure, the second light source is disposed at a second position which is located obliquely above the upper surface of the nail placement structure, which is closer to the entrance in the insertion direction than the proximal end side of the nail placement structure, the first light source is configured to emit light obliquely downward from the first position toward the proximal end side of the nail placement structure at a first predetermined inclination angle relative to an extension direction of the upper surface of the nail placement structure, such that, in a state in which the object is inserted in the object insertion receptacle and the nail tip portion of the object is placed on the upper surface of the nail placement structure, the first light source emits light obliquely downward from a tip side of the nail toward a root side of the nail, the second light source is configured to emit light obliquely downward from the second position toward the proximal end side of the nail placement structure at a second predetermined inclination angle relative to the extension direction of the upper surface of the nail placement structure, such that, in the state in which the object is inserted in the object insertion receptacle and the nail tip portion of the object is placed on the upper surface of the nail placement structure, the second light source emits light obliquely downward from the root side of the nail toward the tip side of the nail, and the processor detects a position of a border between the nail and a cuticle part on the root side of the nail based on a first shadow formed by the light emitted from the first light source, detects an end position of the nail tip portion based on a second shadow formed by the light emitted from the second light source, and detects the nail region based on the detected position of the border and the detected end position of the nail tip portion.

2. The drawing apparatus according to claim 1, wherein the processor detects a first outline including at least an outline of the nail on the root side based on the detected position of the border, wherein the detecting the nail region based on the detected position of the border and the detected end position of the nail tip portion includes detecting the nail region based on the first outline.

3. The drawing apparatus according to claim 1, wherein the first predetermined inclination angle at which the first light source is configured to emit light obliquely downward from the first position toward the proximal end side of the nail placement structure is an inclination angle of 5° to 45° relative to the extension direction of the upper surface of the nail placement structure.

4. The drawing apparatus according to claim 1, wherein:
the second predetermined inclination angle at which the second light source is disposed configured to emit light with obliquely downward from the second position toward the proximal end side of the nail placement structure is an inclination angle of 5° to 45° relative to the extension direction of the upper surface of the nail placement structure.

5. The drawing apparatus according to claim 1, wherein the processor is further configured to:

acquire first image data by imaging the object illuminated by the first light source with the first light source turned on and the second light source turned off, acquire second image data by imaging the object illuminated by the second light source with the first light source turned off and the second light source turned on, detect the position of the border based on first specific data corresponding to the first shadow in the first image data, detect a first outline including at least an outline of the nail on the root side based on the position of the border, detect the end position of the nail tip portion based on second specific data corresponding to the second shadow in the second image data, detect a second outline including at least an outline of the nail on the tip side based on the end position of the nail tip portion, and detect the nail region by synthesizing the first outline and the second outline.

6. The drawing apparatus according to claim 1,
the printer includes an inkjet print head separated from the nail for print.

* * * * *

UNITED STATES PATENT AND TRADEMARK OFFICE
CERTIFICATE OF CORRECTION

PATENT NO. : 10,318,838 B2
APPLICATION NO. : 14/932219
DATED : June 11, 2019
INVENTOR(S) : Tomoyuki Nagao Page 1 of 1

It is certified that error appears in the above-identified patent and that said Letters Patent is hereby corrected as shown below:

In the Claims

Column 11, Line 25, Claim 1, Line 35, before "which" insert --and--.

Column 12, Line 23, Claim 4, Line 3, before "configured" delete "disposed".

Column 12, Line 24, Claim 4, Line 4, before "obliquely" delete "with".

Signed and Sealed this
Third Day of September, 2019

Andrei Iancu
*Director of the United States Patent and Trademark Office*